United States Patent
Yamamoto

[15] 3,699,863
[45] Oct. 24, 1972

[54] COMBINED MECHANISM OF SHUTTER AND FILM IN A CAMERA

[72] Inventor: Hideaki Yamamoto, Tokyo, Japan

[73] Assignee: Zenza Bronica Kogyo Kabushiki Kaisha, Tokyo, Japan

[22] Filed: June 3, 1970

[21] Appl. No.: 43,135

[30] Foreign Application Priority Data

June 6, 1969 Japan ..................... 44/44057

[52] U.S. Cl. .............................. 95/31 AC, 95/31 FL
[51] Int. Cl. ........................................... G03b 19/04
[58] Field of Search ..................... 95/31 AC, 31 FL

[56] References Cited

UNITED STATES PATENTS 1,386,733  8/1921  Rosen et al. ............. 95/31 AC

Primary Examiner—Samuel S. Matthews
Assistant Examiner—Monroe H. Hayes
Attorney—Michael S. Striker

[57] ABSTRACT

The invention relates to apparatus for uniformly controlling a combined mechanism in a camera body which is used with a separable film pack so that a film take-up is available independently of variations in operation of the combined mechanism. The combined mechanism may be independent of the shutter release.

4 Claims, 2 Drawing Figures

INVENTOR
HIDEAKI YAMAMOTO

COMBINED MECHANISM OF SHUTTER AND FILM IN A CAMERA

A single-lens reflex camera is usually provided with a combined mechanism which includes the film transporting, shutter cocking and mirror moving mechanism. It is impossible for the conventional combined mechanism to control and carry out a series of operations without releasing the shutter.

An object of this invention is to provide an apparatus which constitutes an improvement over the prior art above mentioned.

An advantage of a camera for use with a roll film pack or magazine is that a number of film packs can be held ready for use with a single camera body by attaching to the latter one film pack at a time.

However, the condition of parts in the camera body varies according to the following conditions of the film packs:

a. the entire film is unexposed,
b. the entire film is exposed,
c. some of the film frames are exposed.

On the other hand, the combined camera mechanism including the shutter cocking mechanism, the mirror moving mechanism and the film transporting mechanism can also assume one of the following conditions:

a. the combined mechanism is ready
b. the combined mechanism is not ready
c. the combined mechanism is about to be ready.

Corresponding to the three variations on the side of a camera body relative to the shutter mechanism and the mirror movement mechanism, there are conceivably three variations on the side of the film packs, too.

This invention allows a combined mechanism to operate independently of the above mentioned conditions of the film packs.

Another object of the invention is to provide an effective combined mechanism for a camera which uses non-perforated roll film equipped with a specific paper on the reverse side of the film; the film take-up and take-off are available through the said specific paper. It is impossible for the conventional combined mechanism to use a mechanism designed for a series of consecutive exposures when the first film take-up is about to be available or the final film take-up is not over after picture-taking. Until this time, it has been necessary for a user on such occasion to repeat incessantly the film transport by means of the shutter release.

Another object of this invention is, therefore, the provision of apparatus for providing such a combined mechanism as to proceed with the continuous film transport without the shutter release.

The invention will be more readily under stood with reference to the following description, examples and drawings which are not limitative but are given for illustrative purposes only. In the drawings.

Figure 1:
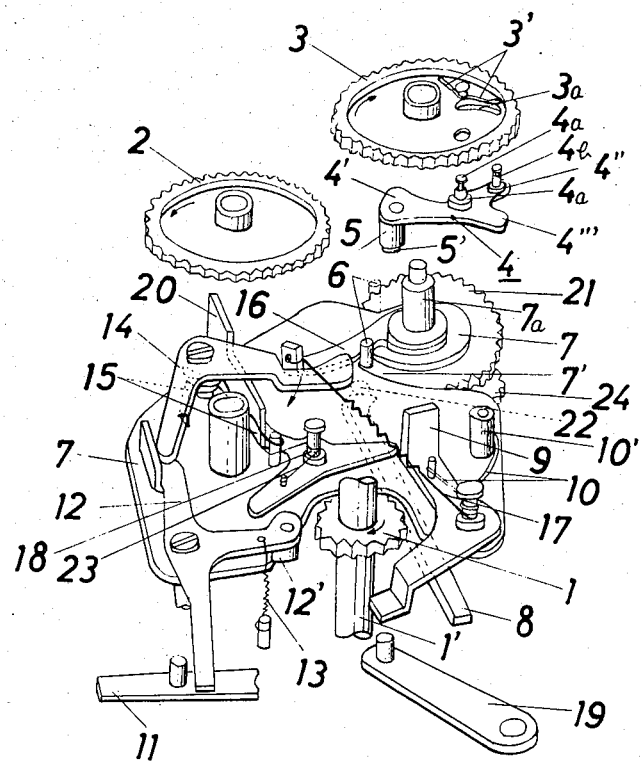
FIG. 1 is an exploded perspective view of the main part of the apparatus of this invention.

The drawing shows a combined mechanism which is installed in a camera body and comprises a shutter cocking mechanism and a film transporting mechanism (a single-lens reflex camera is further provided with a mirror moving mechanism not shown). The roll film which is transported by the film transporting mechanism is stored in a film pack (not shown) which is separately attached to the camera body.

Numeral 1 denotes a driving gear which is connected with the film transporting and shutter cocking mechanism.

Numerals 2 and 3 denote two mating gears which are driven by the driving gear 1. The ratio of the number of teeth on the gears 1, 2, 3 is 1 : 2 : 2. Two revolutions of the gear 1 will cause one revolution of the mating gears 2 and 3. The gear two meshes with the film take-up gear (not shown in the FIGURES). The film transport is completed before the gear 2 completes one revolution. When the film transport is completed, the aforementioned film pack displaces a link 11. The gear 3 is connected to the shutter cocking mechanism which comprises a claw 4; a pin 4a of the claw 4 is turnable in the gear 3. The claw 4 further comprises projections or arms 4', 4'' and 4'''. The arm 4' carries a shaft 5' for an idler roller 5. The arm 4'' carries a guide pin 4b which extends into an arcuate slot 3a of the gear 3 to guide the claw 4 so that the latter turns around the pin 4a. A prestressed spring 3' urges the roller 5 on the shaft 5' of the arm 4' to move toward the center of the gear 3. Numeral 6 denotes a pin mounted at the upper side of a gear 21 connected to the first travelling blind of the focal plane shutter; the gear 21 is fixed to the shaft 7a of the gear 3. The pin 6 is in contact with the roller 5 so as to drive the blind gear 21. The pin 6 can enter a notch 7' provided in a part of a platform 7 to maintain the shutter mechanism in a position of readiness. In such position, a latch pin 22 mounted at the underside of the gear 21 engages a first travelling blind latch 8. Numeral 9 denotes a releasing level which is supported by a shaft on the platform 7. The lever 9 is biased by a spring 10 toward engagement with a brake 10'. The link 11 controls the extent of movement of a T-shaped lever 12 supported by a shaft of the platform 7. The lever 12 is continuously biased in a clockwise direction by a spring 13. The link 11 can be moved to positions I, II, and III shown in FIGS. 2, 3 by means of the film pack mechanism. Such operation will be described below. Numeral 14 denotes an L-shaped brake lever which is biased by a spring 15. The numeral 16 denotes a lever provided on the shaft 7a of the gear 3. The lever 16 is coupled with a spring 17; a part of the side of the lever 16 can enter the notch 7' of the platfor 7; the top of the same lever 16 can drawback the L-shaped brake lever 14 out of the range of the shutter mechanism claw 4; when the side part of the said lever 16 is not about to enter the notch 7' of the platform 7, the L-shaped brake lever 14 is located in the path of the shutter claw 4 so as to stop the said claw. Numeral 18 denotes the shaft of a non-feeding lever 20 which is biased by a spring 23 in a counterclockwise direction. Numeral 19 denotes a lever for the shutter release. Numeral 24 denotes a gear for the second travelling blind mechanism which is controlled by the first travelling blind gear 21.

The mode of operation is as follows:

A crank (not shown in the FIGURES) provided on the side of the camera body serves to rotate the gear 1 in a clockwise direction. The gear 2 mates with the gear 1 and is rotated in a counterclockwise direction; the gear 3 meshes with the gear 2 and is rotated in a clockwise direction.

The gear 2 also meshes with a gear of the film transporting mechanism. The shutter mechanism claw 4, supporting the roller 5, is mounted on the gear 3 which turns in a clockwise direction; the roller 5 meets the pin 6 of the gear 21 which is connected to the first travelling blind so that the gear 3 drives the pin 6 by means of the roller 5 (see FIG. 3); the pin 6 is arrested on entry into the notch 7' of the platform 7.

Figure 2:
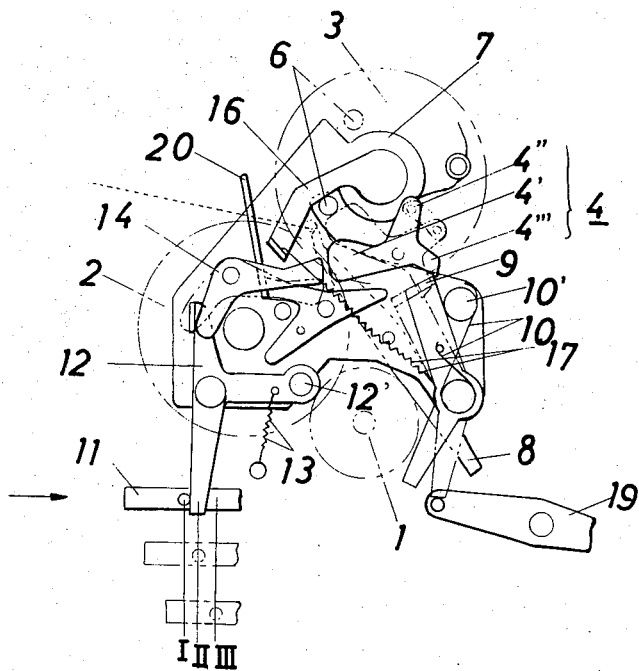
FIG. 2 and FIG. 3 show the structure of FIG. 1 in plan view, with the parts illustrated in two different positions.

The arm 4''' of the claw 4 engages an upstanding portion of the releasing lever 9 whereby the lever 9 moves from the solid line position to the chain line position of FIG. 2 against the opposition of the spring 10. The shutter cannot be released because the lower end of the releasing lever 9 is located in the path of a pin 19a on the shutter release lever 19 (see FIG. 2).

When the pin 6 is caused by the roller 5 to enter the notch 7' of the platform 7, the first travelling blind latch 8 engages the latch pin 22 at the underside of the gear 21 which is connected to the first travelling blind; the roller 5 is kept from the tension of the first travelling blind spring maintained by the pin 6; the tension of the spring 10 is maintainable; the arm 4''' of the shutter mechanism claw 4 is pushed by the release lever 9; the lever 9 and the claw 4 move from the positions shown by chain lines to those shown by solid lines, see FIG. 2.

When the gear 21 connected to the first travelling blind mechanism is rotated as above mentioned, it rotates the second blind gear 24 which is mounted on the shaft of the gear 21.

When the gear completes two revolutions, each of the mating gears 2, 3 completes a single revolution. In a usual case the film take-up mechanism is operated by the mating gear 2; the transport of film in a film pack is completed and the film is ready for picture taking.

In other words, the shutter mechanism is set and at the same time the film is positioned for picture taking and the shutter mechanism is ready to operate.

When the shutter is released, the pin 19a of the lever 19 pushes and drives the first travelling blind latch 8; the latch pin 22 is disengaged so as to assume the chain line position shown in FIG. 2. In the meantime the shutter release, i.e., the focal plane shutter release made of the operations of the first and second travelling blinds becomes ready to operate. In this case the releasing lever 9 is shifted a little anti-clockwise from the position shown by the chain line to that of the solid line as shown in FIG. 2; the pin 6 returns to the position shown by the chain line without meeting the roller 5.

When the present process proceeds with further combined mechanism, the arm 4''' of the shutter mechanism claw 4 slides over the top of the releasing lever 9 due to rotation of the gear 3 and moves without engagement with the releasing lever 9. The arm 4''' passes over the notch 7' of the platform 7 and engages the pin 6 of the first travelling blind gear 21 to push the pin 6 again and operate the film take-up and the shutter mechanisms as above mentioned.

The purpose of the link 11 is to control the lever 12; the said link is moved to the three different positions I, II and III by means of the impulses from the film pack mechanism as shown in FIG. 2.

The link 11 assumes the position I when the film is ready for picture taking.

The 11 assumes the position II when the film transport is not completed after picture taking.

The link 11 assumes the position III when the first film is not ready yet or the film is not rolled up spool yet after a series of consecutive exposures are rolled.

I. In this case the film transport is completed and the gear 2 meshes with the gear 1 simply rotates without engagement with the mechanism for a series of consecutive exposures (not shown in FIG.) provided in a camera body; the first travelling blind gear 21 is driven by the gear 3 as above mentioned and the focal plane shutter mechanism is cocked.

Either when the first travelling blind gear 21 is not ready to operate the mechanism or when the said gear is about to be ready to do so, the roller 5 pushes and drives the pin 6 in response to rotation of the gear 1. When the first travelling blind gear 21 is completely ready and the shutter mechanism 4 is in the solid line position of FIG. 2, the claw is held against rotation as the roller 5 meets the brake 14.

The gear 1 rotates without transporting the film and such rotation continues until the focal plane shutter mechanism is ready.

II. In this case the lever 12 is pivoted anti-clockwise a little further by means of the link 11. While meeting the lever 12, the L-shaped brake 14 is driven clockwise and so diverted as to permit the roller 5 to move (see FIG. 2).

Thus, the shutter mechanism of a camera body is related to the factors made of the occasion when the said mechanism is ready, not ready or about to be ready.

In case the said mechanism is not ready, as above mentioned, by rotating gear 1, the roller 5 of the shutter fits in the pin 6; the rotation of the first travelling blind gear 21 allows the pin 6 to fall into the notch 7' of the platform 7, when a series of consecutive exposures are made, the impulse from the film pack mechanism draws back the link 11 to the position I; the L-shaped brake 14 is moved back to the solid line position shown in FIG. 2; thus, the roller 5 is kept from further movement.

In case the shutter mechanism is about to be ready, the roller 5 of the shutter mechanism claw 4 is disengaged from the pin 6; the L-shaped brake 14 is moved out of the path of the roller 5; by rotating the gear 1, the shutter mechanism claw 4 as shown by the solid line in FIG. 2 moves clockwise as to have the roller 5 encounter the pin 6; as above mentioned, the pin 6 is so pushed as to let the same fall into the notch 7' of the platform 7; the pin 22 gets in contact with the first travelling blind latch 8. This is when the said mechanism is ready. Also, in this case, the impulse that a series of consecutive exposures are ready for rolling by means of the gear is transmitted to the link 11. Thus, the link 11 assumes the I and the brake 14 assumes the solid line shown in FIG. 2 as to mesh with the roller 5 of the shutter mechanism claw 4

When the shutter mechanism is ready, the pin 6 is in the solid line position shown in FIG. 2 and L-shaped brake 14 is in the chain line position shown in FIG. 2. The roller 5 is free to rotate the gears 2,3 by means of the gear 1; when a series of consecutive frames are transported by means of the gear 2, the link 11 dwells in the position I and returns the brake lever 14 to the solid line position shown in FIG. 2; the roller 5 is met by the same brake so as to be ready.

III. In this case, the impulse from the film pack mechanism moves the line 11 to position of FIG. 3; the sidepiece 12' of the lever 12 pushes the non-feeding lever 20 so as to position the end of the said sidepiece to the locus of the arm 4''' of the shutter mechanism claw 4.

Figure 3:
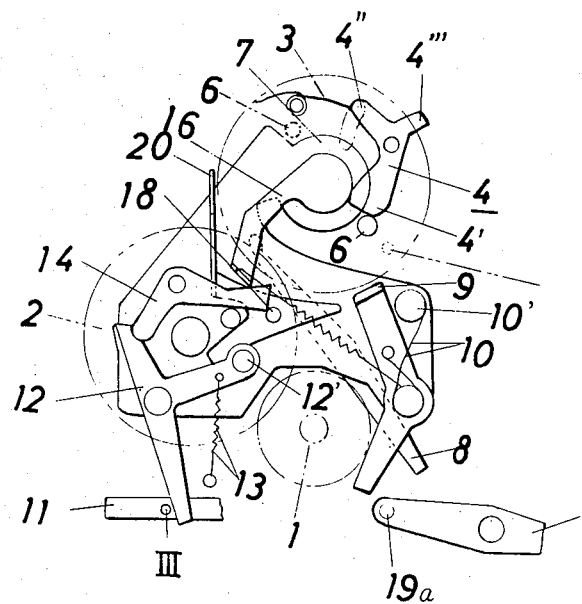

As the shutter mechanism is not set to be ready, i.e., as the pin 6 of the first travelling blind gear 3 is positioned at the chain line shown in FIG. 3, the rotation of the gear 3 in response to rotation of the gear 1 drives the shutter mechanism claw 4. When the arm 4''' engages with the top of the non-feeding lever 20, the said shutter mechanism claw 4 is driven anti-clockwise toward the center of the axis 4a of the same claw, which disengages the roller 5 from the pin 6. Thus, the said roller 5 continues to rotate clockwise over the pin 6.

When the rolled-up film is taken out, the above mentioned condition continues: like the occasion of the first film take-up, the first film-set is transmitted to the line 11 by means of the said impulse. If the link 11 moves to the position I, the lever 12 moves to the position shown in FIG. 2 from that shown in FIG. 3: the sidepiece 12' of said lever relieves the pushing force from the non-feeding lever 20 and the lever 20 draws back. The arm 4''' of the shutter mechanism claw 4 is not in engagement, but the roller 5 is in engagement with the pin 6. Pushing the said pin 6, the first travelling blind gear 21 is rotated so as to be set for operation.

Thus, this invention allows the user to get the film ready for take-up without releasing the shutter when the first film is not ready; it enables the film to take-up spool without releasing the shutter ever after a series of consecutive exposures are rolled; this invention is available conveniently for a camera requiring the non-perforation 6×6 roll film pack is available for any occasions ever when the condition of the shutter mechanism varies relative to that of the film pack mechanism; by rotating the lever or the handle connected to the combined mechanism in a camera body the same condition can be expected with respect to the shutter mechanism or the film take-up mechanism; it is not necessary for a user to operate the shutter mechanism even when the combined mechanism is not ready yet.

While the invention has been disclosed herein in connection with the above mentioned embodiment, it is clear that changes and modifications can be made by those skilled in the art; while the above instance is relating to a camera body designed to attach a film pack which requires a roll film, this invention is available either for a camera body requiring the same mechanism as that of the film pack as otherwise would have been attached, or for the lens shutter instead of the focal plane shutter. Such changes within the principles of this invention are intended to be included within the scope of the claims.

I claim:

1. In a camera for use with a film pack removably secured to the rear portion of the camera body, a combination comprising a gear rotatably mounted in said body; a shutter mounted in said body; a shutter cocking mechanism mounted in said body and including a claw receiving motion from said gear; a first lever coaxial with said gear; a brake lever engaging said first lever; a link movable in response to transport of film in an attached pack; a third lever mounted in said body and arranged to move said brake lever in response to movement of said link before and after the transport of film in the attached pack; a fourth lever mounted in said body and movable by said third lever into the path of movement of said claw; and a release member for said claw.

2. A combination as defined in claim 1, wherein said claw comprises three arms the first of which is provided with a roller, and further comprising a guide pin engageable by said roller, a spring for biasing the second arm of said claw so as to move said roller toward the axis of said gear, the third arm of said claw being engageable by said release member and by said fourth lever to turn against the opposition of said spring and to thus disengage said roller from said pin.

3. A combination as defined in claim 1, further comprising a driver gear for said first mentioned gear and a third gear driven by said driver gear, said first mentioned and said third gears being arranged to complete one revolution in response to two revolutions of said driver gear and said third gear being arranged to effect the transport of film in an attached pack.

4. A combination as defined in claim 1, wherein said link is movable between three different positions.

* * * * *